2,842,522

HYDROXY-ALKOXYLATED ORGANOSILICON COMPOUNDS

Cecil L. Frye, Midland, Mich., assignor to Dow Corning Corporation, Midland, Mich., a corporation of Michigan No Drawing. Application May 21, 1956
Serial No. 585,922

2 Claims. (Cl. 260—46.5)

This invention relates to organosiloxanes having both silicon bonded hydroxyl groups and silicon bonded alkoxy groups.

For the past several years there has been considerable progress in upgrading the properties of organic resins by incorporating therein organosilicon compositions. The first attempts at this process involve merely blending an organosilicon compound with an organic resin. It was soon found, however, that such blends suffered from serious disadvantages and ways were sought to chemically combine the organosilicon compound with the organic resin. One field which has received considerable effort has been the combining of organosilicon compounds with "preformed" hydroxylated alkyd resins. In general, the two most important methods involve the reaction of a monomeric silane with a hydroxylated alkyd resin or the reaction of a partially condensed siloxane with such a resin. There are other modifications of this procedure but the one which is becoming the most accepted, particularly with respect to protective coating compositions, involves the reaction of a partially condensed siloxane with a preprepared alkyd resin.

Two variations of this method are shown in United States Patents 2,587,295 and 2,735,825. The former patent teaches the use of partially alkoxylated polysiloxanes which are free of silicon bonded hydroxyl groups. Whereas these materials are adaptable for use with many types of alkyd resins it has been found that they are not universally satisfactory. For example, the alkyd has to be especially formulated for use with the alkoxylated siloxanes. Thus, a large variety of commercial alkyds are unsuitable.

The second of the above patents teaches the use of certain "completely hydrolyzed" organosiloxanes for reaction with alkyd resins. Completely hydrolyzed siloxanes, of course, are those which are free of silicon bonded alkoxy groups but which contain silicon bonded hydroxyl groups. It has been found that siloxanols which are free of alkoxy groups do not have as good reactivity with preformed alkyd resins as do the siloxanes of this invention.

The applicant has discovered that by employing siloxanes having the defined amount of silicon bonded hydroxyl and the defined amount of silicon bonded alkoxyl groups infra, he is able to obtain greater reactivity with preformed alkyd resins than with siloxanes containing hydroxyl alone or alkoxyl alone. This result is most unexpected in view of what has previously been known concerning the action of organosilicon compounds with alkyd resins.

It is the primary object of this invention to prepare novel organosilicon compositions which react with greater facility with alkyd resins than organosilicon compositions heretofore employed. Another object is to provide organosilicon intermediates which can be processed to a solvent-free state without losing an appreciable amount of reactivity toward alkyd resins. Another object is to prepare organosilicon intermediates which are especially adapted for use with epoxide resins. Other objects and advantages will be apparent from the following description.

This invention relates to organosiloxane compositions having the average empirical formula

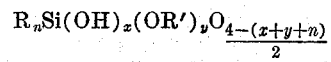

in which R is a monovalent hydrocarbon radical and in which at least 40% of the R groups are aryl hydrocarbon radicals, $n$ has an average value from .9 to 1.4, $x$ has an average value of from .15 to .9, R' is an aliphatic hydrocarbon radical, $y$ has an average value from .005 to .2 and in which the sum of $x+y$ is greater than .2 and the ratio of $x$ to $y$ is greater than 1.

The primary advantages of this invention reside in the discovery that the above critical ratios of hydroxyl and alkoxyl to silicon give intermediates which are uniquely useful for reaction with hydroxylated organic resins. Organosiloxanes in which the ratio of organic radicals to silicon, or hydroxyl to silicon, or alkoxyl to silicon fall outside the scope of the above defined limits give inferior performance with organic resins. The best resins within the scope of this invention are those in which $n$ is from 1 to 1.2, $x$ is from .15 to .5 and $y$ is from .02 to .1.

The compositions of this invention are prepared under conditions which will prevent the complete hydrolysis of the silicon bonded alkoxyl groups and also the complete condensation of the hydroxyl groups. In general these compositions can be prepared by two methods. One expeditious method is that of adding a mixture of the corresponding chlorosilanes and a water immiscible solvent to a mixture of an alcohol and water. In all cases the water employed is in excess of that amount required to completely hydrolyze all of the halogen on the silicon. It has been found that under these conditions the amount of OR' groups remaining in the siloxane after hydrolysis depends upon (1) the amount of alcohol present during hydrolysis and (2) the solubility of the alcohol in water.

The more alcohol present during hydrolysis, the higher will be the alkoxyl content of the resin up to a point. After that, the amount of alkoxyl does not increase with additional alcohol. The less soluble the alcohol, the less is required to produce a given alkoxyl content in the finished resin.

The precise conditions necessary to produce a given alkoxyl content varies somewhat depending upon the R groups on the silicon. In general, however, all resins within the scope of this invention can be made by employing from .2 to 2 mols of alcohol per mol of silicon during the hydrolysis.

The complete hydrolysis of the alkoxy groups from the silicon and the complete condensation of the hydroxyl groups is avoided by removing the water and acid from the reaction mixture prior to removal of the excess alcohol and solvent. When the above conditions are adhered to, products within the scope of this invention are obtained.

An alternative method of preparing the compounds of this invention is to partially hydrolyze an alkoxysilane. In general this is done by heating the silane with water in the presence of acid until the required amount of alkoxyl groups has been removed. The conditions during the heating should be insufficient to cause condensation of all of the hydroxyl.

For the purpose of this invention the siloxane can be a partially hydrolyzed, hydroxylated monoaryl hydrocarbon siloxane such as monophenylsiloxane, monotolylsiloxane or monoxenylsiloxane or mixtures and copolymers of such siloxanes with any monovalent hydrocarbon substituted siloxane. Thus the siloxanes employed in this invention can be composed of various combinations of siloxane units of the type $RSiO_{3/2}$, $R_2SiO$, $R_3SiO_{.5}$ and $SiO_2$. In all cases the total number of hydrocarbon groups per silicon should be from .9 to 1.4 and at least 40% of the total number of hydrocarbon groups should be aryl hydrocarbon radicals.

Specific examples of R groups which can be substituted on the silicon are alkyl radicals such as methyl, ethyl, butyl and octadecyl; alkenyl groups such as vinyl, allyl and hexenyl; cycloaliphatic groups such as cyclopentyl, cyclohexyl and cyclohexenyl; aralkyl hydrocarbon groups such as benzyl and aryl hydrocarbon groups such as phenyl, tolyl, xenyl, naphthyl and anthracyl.

For the purpose of this invention R' can be any aliphatic hydrocarbon radical such as methyl, ethyl, octadecyl, vinyl, allyl, hexenyl, isopropyl, tertiary-amyl and 2-ethylhexyl.

The preferred compositions are those in which at least 40% of the R groups are phenyl and the remaining R groups are lower alkyl radicals or cycloaliphatic radicals of less than 8 carbon atoms. In the preferred compounds R' is an alkyl radical of less than 10 carbon atoms.

The compositions of this invention can be reacted with a wide variety of hydroxylated organic compounds to give a wide variety of modified organic resins. For example, they may be reacted with polyhydric alcohols, fatty acid glycerides, phenol aldehyde resins, alkyd resins, epoxide resins or polyester resins. The alkyd resins can be either of the drying oil or non-drying oil type and can be either long or short oil resins. In general all that is necessary to react the materials of this invention with the organic resin is to heat the two in intimate contact until compatibility is obtained. In general compatibility is obtained in a matter of a few minutes to a few hours. The resulting reaction products do not haze upon standing and give clear films when applied to a surface.

Because of the facility with which the compositions of this invention react with the organic resins the danger of gelling a batch is practically eliminated because they become compatible before an excessive viscosity is reached. This means that the cost of the silicone modified organic resins is substantially reduced and the applicability of silicones in the modification of organic resins is greatly extended.

The following examples are illustrative only and should not be construed as limiting the invention which is properly delineated in the appended claims.

EXAMPLE 1

A solution of 211.5 g. of phenyltrichlorosilane in 99 cc. of toluene was added over a period of 4 minutes with vigorous stirring to a mixture of 550 g. of water and 40.8 g. of methylamyl alcohol. During the addition the temperature rose from 10 to 77° C. After 10 minutes the acid-water layer was removed and the resin layer was heated to azeotrope off the residual HCl and water. The resin solution was then stripped of solvent and volatiles by heating up to 160° C. at 200 mm. The resulting product was a hard, friable solid which was a free-flowing liquid at 160° C. The siloxane contained .3 silicon bonded OH's per silicon and .05 methylamyloxy groups per silicon.

This siloxane resin was instantly compatible with a commercial coconut oil glycerol-phthalate alkyd resin. A film of the mixture was allowed to dry and it was haze free.

EXAMPLE 2

A mixture of .9 mol of phenyltrichlorosilane and .1 mol of diphenyldichlorosilane was dissolved in 105 cc. of toluene and added with vigorous stirring to a solution of 64 g. of methanol in 550 g. of water over a period of 2 minutes. The temperature rose from 14 to 75° C. After stirring for 8 minutes the acid-water layer was separated, the toluene layer was refluxed to azeotrope off the residual water and acid, and then the remaining solvent was removed by heating at 175° C. at 30 mm. pressure. The solvent-free product was a hard, friable solid at room temperature which had .4 silicon bonded OH's per silicon and .06 methoxy groups per silicon.

This siloxane resin was immediately compatible with a commercial short coconut oil glycerol phthalate alkyd resin.

EXAMPLE 3

The following example shows the effect of having silicon bonded alkoxyl groups in the siloxane.

In each of the runs shown in the table below a mixture of 190.7 g. of phenyltrichlorosilane and 25.3 g. of diphenyldichlorosilane was dissolved in 136 g. of toluene and the mixture was then added to water containing the amounts of isopropanol shown in the table below. The glycerides were added over a period of 10 minutes during which time the temperature rose from 15 to 75° C. The mixture was agitated for 5 minutes longer and heated at 82° C. The aqueous acid layer was withdrawn and the residual water and HCl were removed by azeotropic distillation and the concentration of the solution was adjusted to 60% by weight.

5 g. of the 60% solution of each resin was mixed with 5 g. of a 45% solution of the alkyd resins shown below. In each case the mixture was heated to 145° C. and samples were withdrawn immediately after reaching this temperature and periodically thereafter. Each sample was allowed to dry. The time required to give a clear film, after the temperature had reached 145° C., is designated the reactivity time in the table below.

Table

| Amount of isopropanol in g. | Amount of water in g. | OH-Si ratio | OR/Si ratio | Reactivity time in min. with alkyd resins | | | | |
|---|---|---|---|---|---|---|---|---|
| | | | | 1 | 2 | 3 | 4 | 5 |
| 0 | 600 | .35 | 0 | 190 | >400 | 200 | 450 | >600 |
| 15 | 585 | .36 | .024 | 90 | >400 | 240 | 400 | 600 |
| 30 | 570 | .36 | .043 | 60 | 330 | 210 | 120 | 550 |
| 60 | 540 | .36 | .047 | 0 | 0 | 130 | 25 | 400 |
| 100 | 500 | .36 | .061 | 0 | 0 | 0 | 0 | 165 |
| 150 | 450 | .36 | .064 | 0 | 0 | 0 | 0 | 0 |

Alkyd resin 1 was a non-drying short coconut oil glycerol-pentaerythritol-phthalic anhydride resin.
Alkyd resin 2 was a semi-drying short soya oil glycerol-phthalate resin.
Alkyd resin 3 was a soya oil monoglyceride for use in varnishes.
Alkyd resin 4 was a drying medium soya oil glycerol-phthalate resin.
Alkyd resin 5 was a drying long soya oil glycerol-phthalate resin.

EXAMPLE 4

A copolymer of 70 mol percent phenylsiloxane and 30 mol percent propylsiloxane containing .23 silicon bonded OH per silicon atom and .05 isopropoxy groups per silicon atom was prepared by cohydrolyzing a mixture of phenyltrichlorosilane and propyltrichlorosilane in a mixture of isopropanol and water in accordance with Example 3. After removal of all of the toluene the resin was a friable solid material which was reacted with the alkyd resins of Example 3. The reactivity time was determined in accordance with Example 3. In all cases the products were haze free.

| Alkyd: | Reactivity time in min. |
|---|---|
| 1 | 0 |
| 2 | 0 |
| 3 | 95 |
| 4 | 207 |
| 5 | 300 |

EXAMPLE 5

The following siloxanes give haze-free compatible resins when reacted with the alkyd resins of Example 3. The siloxanes are prepared by hydrolyzing the corresponding chlorosilanes in accordance with the procedure of Example 3.

(1) $CH_3C_6H_4Si(OH)_{.35}[OCH(CH_3)_2]_{.06}O_{1.295}$.

(2) A copolymer of 70 mol percent monophenylsiloxane and 30 mol percent monocyclohexylsiloxane containing .5 silicon bonded OH and .6 silicon bonded isopropoxy groups.

(3) A copolymer of 40 mol percent monophenylsiloxane, 20 mol percent methylbutylsiloxane, 20 mol percent phenylmethylsiloxane, 10 mol percent monovinylsiloxane, 5 mol percent monoxenylsiloxane and 5 mol percent $SiO_2$, said copolymer containing .36 silicon bonded OH groups and .03 silicon bonded isopropoxy groups.

That which is claimed is:

1. An organosiloxane having the average empirical formula $$R_nSi(OH)_x(OR')_yO_{\frac{4-(x+y+n)}{2}}$$

in which R is a monovalent hydrocarbon radical in which at least 40% of the R groups are aryl hydrocarbon radicals, $n$ has an average value from .9 to 1.4, $x$ has an average value from .15 to .9, R' is an aliphatic hydrocarbon radical, $y$ has an average value from .005 to .2 and in which the sum of $x+y$ is greater than .2 and the ratio of $x$ to $y$ is greater than 1.

2. A composition in accordance with claim 1 where at least 40% of the R groups are phenyl radicals and any remaining R groups are selected from the group consisting of alkyl radicals and cycloaliphatic radicals of less than 8 carbon atoms.

References Cited in the file of this patent

UNITED STATES PATENTS

| 2,584,344 | Goodwin et al. | Feb. 5, 1952 |
| 2,687,396 | McLean | Aug. 24, 1954 |
| 2,695,276 | Hatcher | Nov. 23, 1954 |
| 2,718,507 | Rauner | Sept. 20, 1955 |
| 2,718,508 | Rauner | Sept. 20, 1955 |
| 2,755,269 | Moorhead | July 17, 1956 |